(12) United States Patent
Hirabayashi et al.

(10) Patent No.: US 6,817,949 B2
(45) Date of Patent: Nov. 16, 2004

(54) TORQUE LIMITER AND REEL MOUNT

(75) Inventors: Koichiro Hirabayashi, Osaka (JP);
Kazuo Shibukawa, Osaka (JP); Akio Konishi, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/153,214

(22) Filed: May 21, 2002

(65) Prior Publication Data

US 2002/0183120 A1 Dec. 5, 2002

(30) Foreign Application Priority Data

May 29, 2001 (JP) ......................................... 2001-160418

(51) Int. Cl.[7] .............................................. F16D 27/01
(52) U.S. Cl. ....................... 464/29; 242/356.5; 360/96.3
(58) Field of Search ............................... 464/29, 30, 45, 464/185, 26; 192/56.4, 56.41, 150, 84.3; 242/356.5; 360/96.3

(56) References Cited

U.S. PATENT DOCUMENTS

| | | | | | |
|---|---|---|---|---|---|
| 1,988,413 | A | * | 1/1935 | Bing | 192/56.41 |
| 2,482,428 | A | * | 9/1949 | Miller | 242/288 |
| 3,312,319 | A | * | 4/1967 | Carroll et al. | 192/18 B |
| 4,013,241 | A | * | 3/1977 | Gray | 242/288 |
| 4,544,048 | A | * | 10/1985 | Hoffman | 188/251 A |
| 4,630,149 | A | * | 12/1986 | Ida | 360/96.4 |
| 4,946,115 | A | * | 8/1990 | Muller | 242/289 |
| 6,092,755 | A | * | 7/2000 | Konishi et al. | 242/355.1 |

* cited by examiner

Primary Examiner—David Bagnell
Assistant Examiner—K. Thompson
(74) Attorney, Agent, or Firm—Renner, Otto, Boisselle & Sklar, LLP

(57) ABSTRACT

A torque limiter of the present invention includes: a first rotor and a second rotor; a magnet which is provided so as to be in contact with the first rotor; and a hysteresis board provided so as to be opposed to the magnet with a space therebetween, wherein the hysteresis board is integrally formed with the second rotor, and first and second washers are provided between the first and second rotors so as to be in contact with one another.

10 Claims, 3 Drawing Sheets

TORQUE LIMITER AND REEL MOUNT

BACKGROUND OF THE INVENTION

1. Field of the Invention

The present invention relates to a torque limiter which is used as, for example, a reel mount used for a magnetic recording/reproducing apparatus, such as a videotape or audiotape recorder.

2. Description of the Related Art

Referring to FIGS. 5 and 6, a structure of a conventional torque limiter will be described below.

FIG. 5 is a top view of a conventional torque limiter 500. FIG. 6 is a cross-sectional view of the conventional torque limiter 500 taken along line B—B shown in FIG. 5.

In FIG. 6, reference numeral 1a denotes a reel in a cassette. A (magnetic) tape (not shown) is wound around the reel 1a. Reference numeral 1b denotes a body of the cassette, reference numeral 2 denotes a chassis of a conventional magnetic recording/reproducing apparatus, such as a videotape or audiotape recorder, used for recording/reproducing information to/from the magnetic tape of the cassette, and reference numeral 3 denotes a rotation shaft provided in the chassis 2. The conventional reel mount is placed on the rotation shaft 3 so as to be rotatable with respect to an axis of the rotation shaft 3 (shown as a broken line in FIG. 6). Reference numeral 303 denotes an upper reel mount member on which the reel 1a is mounted. Reference numeral 305 denotes a rotation engagement member which is movable up and down (i.e., in a direction parallel to the axis of the rotation shaft 3) and is engaged with the upper reel mount member 303 and the reel 1a along a rotation direction of the conventional reel mount, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307 is integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke 307 is rotatable with respect to the axis of the rotation shaft 3. The integral upper reel mount member 303 and yoke board 307 together form a first rotor of the conventional reel mount. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower reel mount member (a second rotor) integrally formed with a hysteresis board 311 having a disk-like shape. The hysteresis board 311 is made of a material having large magnetic hysteresis loss. It is common practice in the field of magnetic recording/ reproducing apparatuses to integrally form a hysteresis board member, such as the hysteresis board 311, with a lower reel mount member, such as the lower reel mount member 310, by outsert molding. Similar to the upper reel mount member 303, the lower reel mount member 310 integrally formed with the hysteresis board 311 is placed on the rotation shaft 3 so as to be rotatable with respect to the axis of the rotation shaft 3. The lower reel mount member 310 is attracted by the magnetic force generated by the magnet 308 so as to be in contact with the upper reel mount member 303.

Reference numeral 309 denotes a washer sandwiched between the lower reel mount member 310 integrally formed with the hysteresis board 311 and the upper reel mount member 303. The washer 309 is engaged with the lower reel mount member 310 so as to be rotated therewith. Usually, grease (not shown) is applied to the washer 309. Reference numeral 302 denotes a gear member provided to the outer circumference of the lower reel mount member 310, which is engaged with an external gear (not shown). Reference numeral 306 denotes a reel bearing member provided on the upper reel mount member 303 and integrally formed with the yoke board 307 so as to come into contact with the reel 1a when the reel 1a is mounted on the conventional reel mount. Similar to the other reel mount members, it is common practice in the field of magnetic recording/ reproducing apparatuses to integrally form a reel bearing member, such as the reel bearing member 306, with a yoke board member, such as the yoke board 307, by outsert molding.

When the reel 1a is mounted on the conventional reel mount, a position in a vertical direction of the reel 1a with respect to the chassis 2 is defined by the reel bearing member 306. Reference numeral 4 denotes a chassis washer placed between the reel mount and the base of the rotation shaft 3 so as to define a space between the chassis 2 and the lower reel mount member 310. Reference numeral 5 denotes a shaft washer placed on the rotation shaft 3 so as to define movement of the reel mount along a thrust (vertical) direction of the reel mount and to provide a space between the rotation shaft 3 and the upper reel mount member 303.

Operation of the conventional reel mount is described below.

When the lower reel mount member 310 is rotated by the external gear through engagement with the gear member 302, friction torque is generated between the upper and lower reel mount members 303 and 310 via the washer 309 due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a.

However, in the conventional reel mount, it is difficult to generate stable clutch torque. Clutch torque generated by a reel mount is always required to be stable without being affected by various disturbances in order to provide reliable and stable operation of the torque limiter. Specifically, the clutch torque must be stable even if there are variations in the rotating speed of the reel mount, the environmental temperature or humidity, the operating time of the reel mount, etc. Friction torque, which contributes to the clutch torque generated by the conventional reel mount, is affected by the stability of a coefficient of friction between the washer 309 and the upper reel mount member 303. The coefficient of friction refers to a value of a physical property of the materials used for the washer 309 and the upper reel mount member 303. In consideration of the strength and the compatibility with a material of the reel in the cassette, i.e., to enable easy mounting of the reel on the upper reel mount member 303, selection of the material for the upper reel mount member 303 is limited. Thus, it is very difficult to select a material for the upper reel mount member 303 which provides a stable coefficient of friction between the upper reel mount member 303 and the washer 309 in the conventional reel mount. Therefore, the torque limiting stability of the conventional torque limiter is unreliable and unstable.

The present invention provides solutions to the above-described problems of the conventional torque limiter as described below.

SUMMARY OF THE INVENTION

According to one aspect of the present invention, there is provided a torque limiter which includes: a first rotor and a second rotor; a magnet which is provided so as to be in contact with the first rotor; and a hysteresis board provided so as to be opposed to the magnet with a space therebetween, the hysteresis board is integrally formed with the second rotor, and first and second washers are provided between the first and second rotors so as to be in contact with one another.

In one embodiment of this invention, the first and second rotors are rotatable about a single rotation shaft.

In this torque limiter structure of the present invention, it is possible to select materials for the first and second washers which provide reliable and stable clutch torque regardless of the materials used for the first and second rotors.

In one embodiment of this invention, one of the first and second washers is made of a metal-based material and the other one of the first and second washers is made of a resin-based material.

In one embodiment of this invention one of the first and second washers is made of a steel-based metal material.

In this torque limiter structure of the present invention, a washer made of a metal-based material and another washer made of a resin-based material are in contact with each other while being rotated, so that stable clutch torque is realized.

In one embodiment of this invention, one of the first and second washers is made of any one of polyethylene, UHMW polyethylene, POM, FR, PET, PA, PPS, PBT, PI and PEEK.

In one embodiment of this invention, one of the first and second washers is made of a steel-based metal material and the other one of the first and second washers is made of anyone of polyethylene, UHMW polyethylene, POM, FR, PET, PA, PPS, PBT, PI and PEEK.

In this torque limiter structure of the present invention, the metal-based washer is made of a steel-based metal material and the resin-based washer is made of any one of polyethylene, UHMW polyethylene, POM, FR, PET, PA, PPS, PBT, PI and PEEK, thereby providing superior stable clutch torque.

In one embodiment of this invention, the first washer includes portions for engagement with the first rotor and the second washer includes portions for engagement with the second rotor.

In one embodiment of this invention, an outer circumference of the first washer is provided with the portions for engagement with the first rotor and an inner circumference of the second washer is provided with the portions for engagement with the second rotor.

In one embodiment of this invention, the magnet is provided with a protrusion portion which interlocks with the engagement portion of the first washer so as to provide engagement of the first washer with the first rotor through the contact of the magnet and a yoke board integrally formed with the first rotor.

In one embodiment of this invention, the second rotor is provided with a protrusion portion which interlocks with the engagement portion of the second washer so as to provide engagement of the second washer with the second rotor.

In this torque limiter structure or the present invention, an outer circumference of a washer is provided with portions for engagement with a rotor and an inner circumference of another washer is provided with portions for engagement with another rotor, whereby it is possible to realize a compact torque limiter which generates stable clutch torque.

Thus, the invention described herein makes possible the advantages of providing a compact torque Limiter which generates stable clutch torque, and therefore provides reliable stable operation for use with a magnetic recording/reproducing apparatus, for example.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to FIGS. 1 to 4.

EXAMPLE 1

Figure 1:
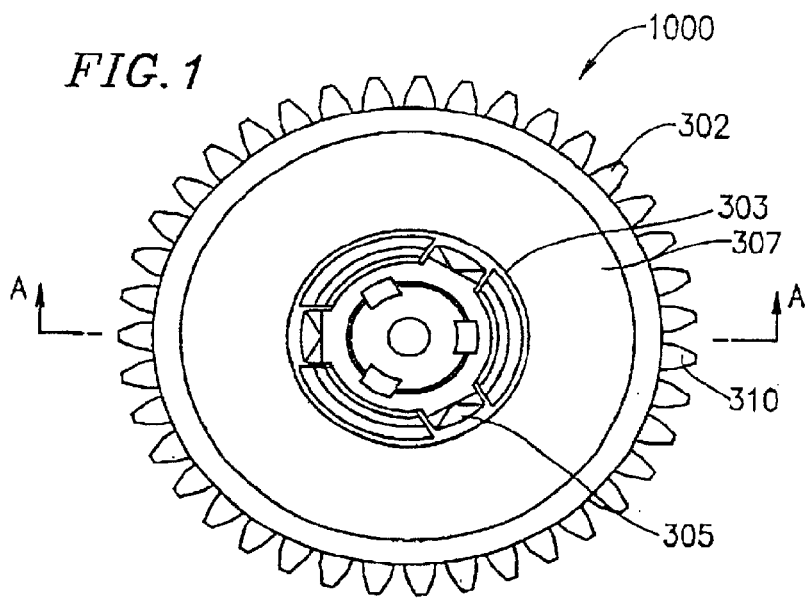
FIG. 1 is a top view of a torque limiter according to Example 1 of the present invention.
Figure 2:
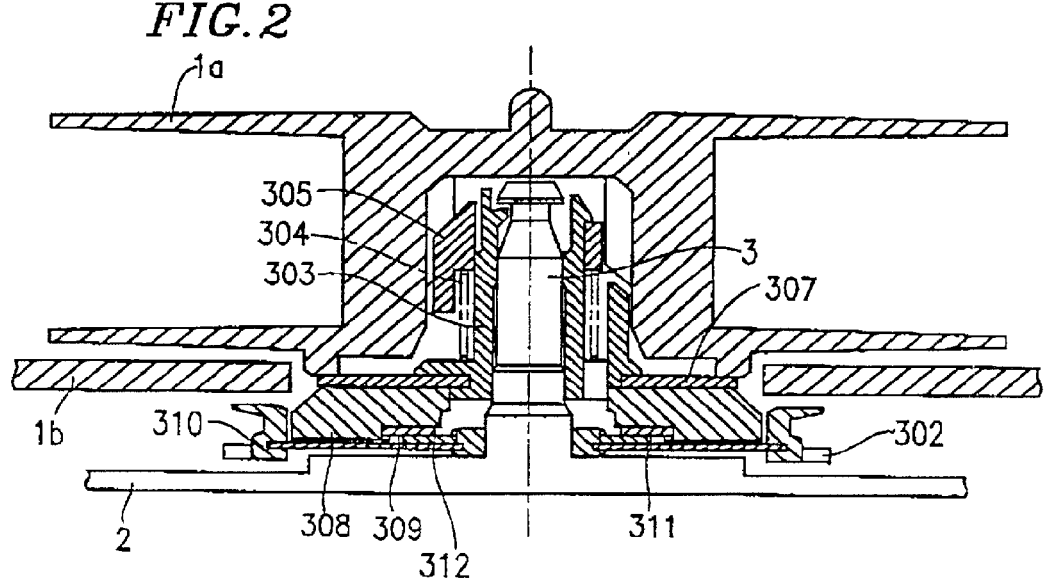
FIG. 2 is a cross sectional view of the torque limiter according to Example 1 of the present invention taken along line A—A shown in FIG. 1.
Figure 3:
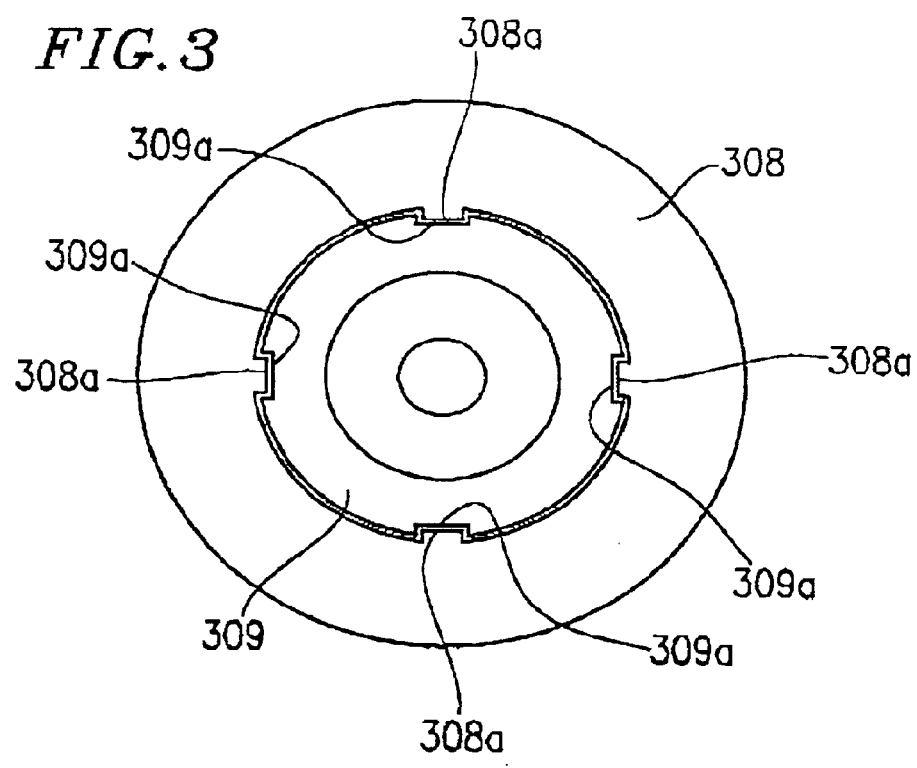
FIG. 3 is a backside view of an upper reel mount member of the torque limiter according to Example 1 of the present invention.
Figure 4:
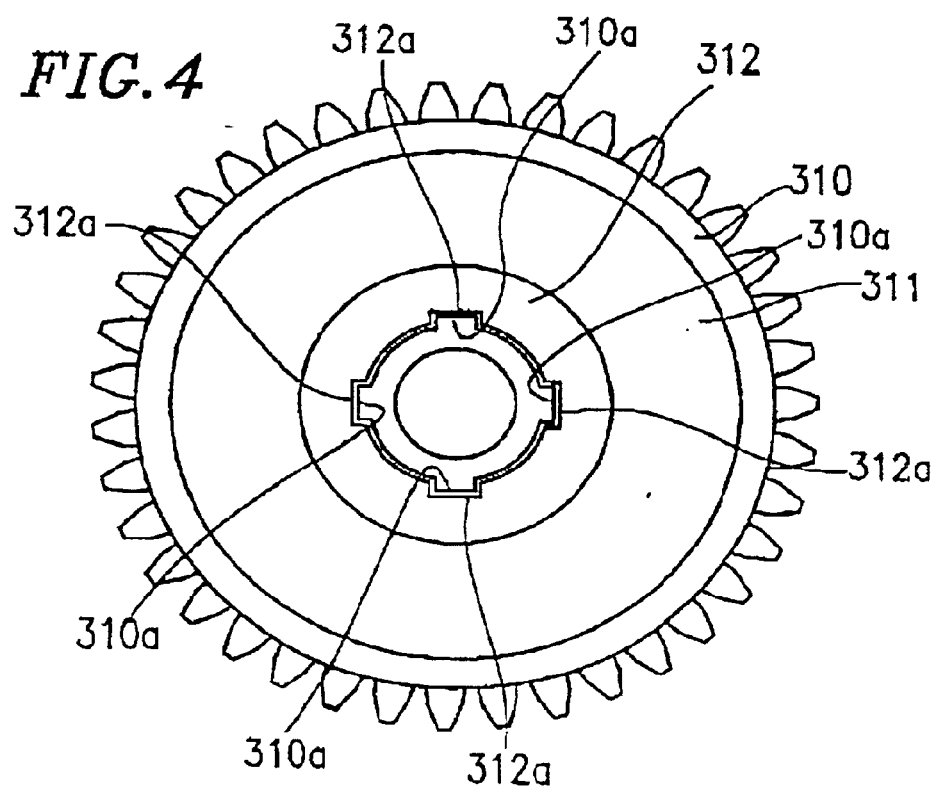
FIG. 4 is a top view of a lower reel mount member of the torque limiter according to Example 1 of the present invention.
Figure 5:
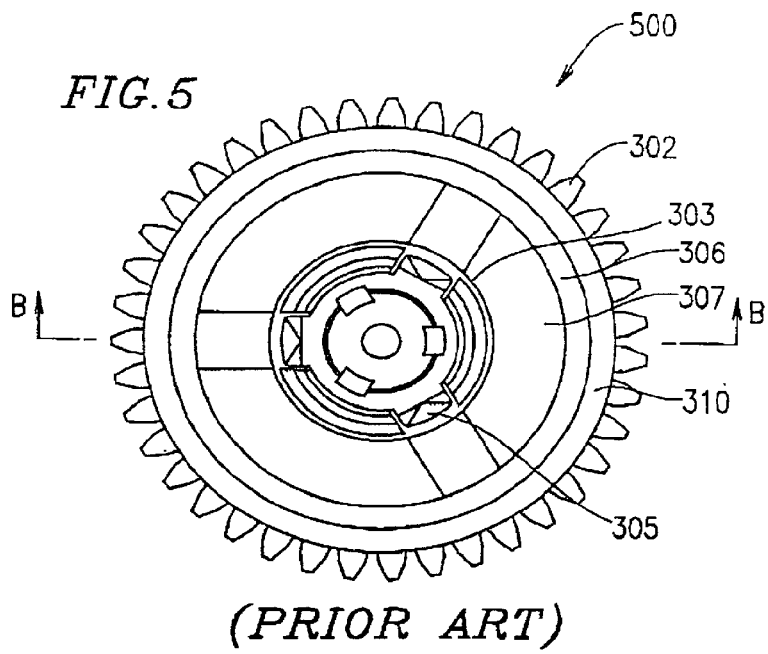
FIG. 5 is a top view of a conventional torque limiter.
Figure 6:
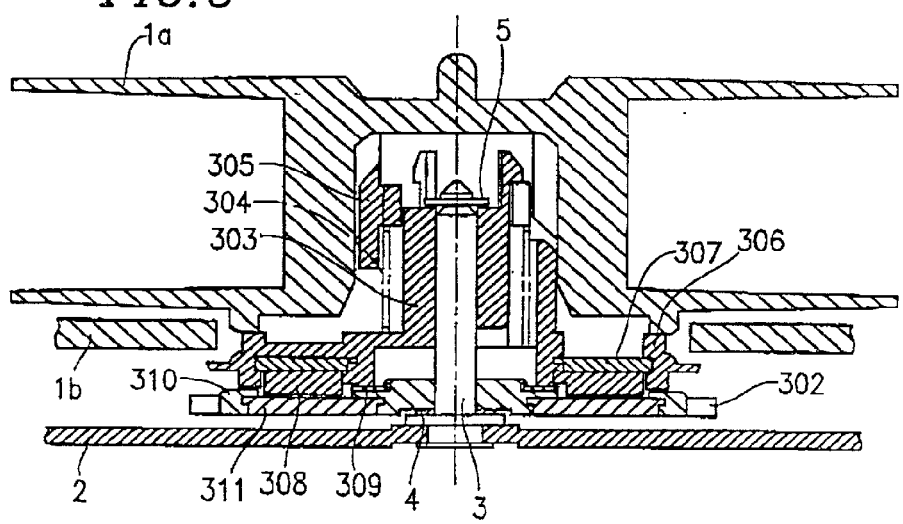
FIG. 6 is a cross-sectional view of the conventional torque limiter taken along line B—B shown in FIG. 5.

FIG. 1 is a top view of a torque limiter 1000 according to Example 1 of the present intention. FIG. 2 is across sectional view of the torque limiter 1000 according to Example 1 of the present invention taken along line A—A shown in FIG. 1. FIG. 3 is a backside view of an upper reel mount member of the torque limiter 1000 according to Example 1 of the present invention. FIG. 4 is a top view of a lower reel mount member of the torque limiter 1000 according to Example 1 of the present invention. In FIGS. 1 through 4, components having the same functions and names as those shown in FIGS. 5 and 6 are denoted by the same reference numerals.

The "torque limiter" described herein is a reel mount on which a reel in a cassette is mounted, the torque on the reel when mounted being limited (controlled) by the torque limiter, As such, the terms "torque limiter" and "reel mount" are interchangeably used in this description.

In FIG. 2, reference numeral 1a denotes a reel in a cassette. A (magnetic) tape (not shown) is wound around the reel 1a. Reference numeral 1b denotes a body of the cassette, reference numeral 2 denotes a chassis of a magnetic recording/reproducing apparatus, such as a videotape or audiotape recorder, used for recording/reproducing information to/from the magnetic tape of the cassette, and reference numeral 3 denotes a rotation shaft provided in the chassis 2. For example, the rotation shaft 3 can be is integrally formed with the chassis as shown in FIG. 2. The reel mount according to Example 1 of the present invention is placed on the rotation shaft 3 so as to be rotatable with respect to an axis of the rotation shaft 3 (shown as a broken line in FIG. 2). Reference numeral 303 denotes an upper reel mount member on which the reel 1 is mounted. Reference numeral 305 denotes a rotation engagement member which is movable up and down (i.e., in a direction parallel to the axis of the rotation shaft 3) and is engaged with the upper reel mount member 303 and the reel 1a along a rotation direction of the reel mount, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307 integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke board 307 is rotatable with respect to the axis of the rotation shaft 3. The integral upper reel mount member 303 and yoke board 307 together form a first rotor of the reel mount according to the present invention. Accordingly, the first rotor is rotatable with respect to the rotation shaft 3. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower reel mount member (a second rotor) integrally formed with a hysteresis board 311 having a disk-like shape. The hysteresis board 311 is made of a material having large magnetic hysteresis loss. It is common practice in the field of magnetic recording/reproducing apparatuses to integrally form a hysteresis board, such as the hysteresis board 311, with a lower reel mount member, such as the lower reel mount member 310, by outsert molding. Similar to the upper reel mount member 303, the lower reel mount member 310 (second rotor) integrally formed with the hysteresis board 311 is placed on the rotation shaft 3 so as to be rotatable with respect to the axis of the rotation shaft 3. That is, both the upper and lower reel mount members 303 and 310 are rotatable about a single center of rotation shaft 3. The hysteresis board 311 is attracted by the magnetic force of the magnet 308 so as to be in contact with the magnet 308. Reference numerals 309 and 312 denote first and second washers sandwiched between the magnet 308 and the hysteresis board 311 so as to be in contact with one another. Reference numeral 302 denotes a gear member provided to the outer circumference of the lower reel mount member 310, which is engaged with an external gear (not shown).

As shown in FIG. 3, the first washer 309 is provided with depression portions 309a at the outer circumference thereof, for example. Each depression portion 309a is engaged with a protrusion portion 308a provided on the magnet 308 such that the first washer 309 is rotated with the upper reel mount member 303 due to the contact of the magnet 308 with the yoke board 307 which is integrally formed with the upper reel mount member 303.

As shown in FIG. 4, the second washer 312 is provided with depression portions 312a at the inner circumference thereof, for example. Each depression portion 312a is engaged with a protrusion portion 310a provided on the lower reel mount member 310 such that the second washer 312 is rotated with the lower reel mount member 310. That is, the protrusion portions 308a and 310a of the magnet 308 and the lower reel mount 310, respectively, interlock with the depression portions 309a and 312a of the first and second washers 309 and 312, respectively.

The first washer 309 is made of a resin-based material, such as polyethylene, UHMW (ultra high molecular weight) polyethylene, POM (polyacetal), FR (fluorocarbon resin), PET (polyethylene terephthalate), PA (polyamide), PPS (polyphenylene sulfide), PBT (polybutylene terephthalate), PI (polyimide), or PEEK (polyether etherketone). The second washer 312 is made of a metal-based material, such as a stainless steel board, a cold-rolled steel board, or a nickel-plated cold-rolled steel board.

Operation of the reel mount according to Example 1 of the present invention is described below.

When the lower reel mount member 310 is rotated by the external gear through engagement with the gear member 302, friction torque is generated between the upper and lower reel mount members 303 and 310 via the first and second washers 309 and 312 due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a.

As described above, according to Example 1 of the present invention, unlike the conventional reel mount, the first and second washers 309 and 312 are provided between the upper and lower reel mount members 303 and 310, and since it is possible to easily select materials for the first and second washers 309 and 312 regardless of the materials used for the upper and lower reel mount members 303 and 310 and the coefficient of friction for the friction torque depends on the friction between the first and second washers 309 and 312 only, then the coefficient of friction can be easily maintained at a stable value. That is, while the materials used for the upper and lower reel mount members 303 and 310 are selected so as to provide the necessary strength and compatibility with the material of the reel in the cassette so as to provide easy mounting of the reel on the reel mount, freedom is gained in the present invention for the selection of the materials for the first and second washers 309 and 312 so as to provide stable friction torque. Thus, in the present invention it is possible to realize a torque limiter which generates stable clutch torque.

Further, one of the first and second washers 309 and 312 is made of a metal-based metal material (i.e., steel-based) and the other one of the first and second washers 309 and 312 is made of a resin-based material (i.e., any one of polyethylene, UHMW polyethylene, POM, FR, PET, PA, PPS, PBT, PI, and PEEK, where such materials provide stable clutch torque due to the strength of the metal-based material and the flexibility of the resin-based material. Furthermore, the outer circumference of the first washer 309 is provided with portions (i.e., depression portions 309a) for engagement with the magnet 308 and therefore with the upper reel mount member 303 (i.e., the first washer 309 is engaged with a first rotor), and the inner circumference of the second washer 312 is provided with portions (i.e., protrusion portions 312a) for engagement with the lower reel mount member 310 (i.e., the second washer 312 is engaged with a second rotor), where such stable engagement provides stable friction torque between the first and second washers 309 and 312. Moreover, since the engagement portions of the first and second washers 309 and 312 are not overlapped with each other at either of the outer or inner circumferences thereof, where the respective engagement portions 309a and 312a project from a surface of the first and second washers 309 and 312, the overall thickness of the first and second washers 309 and 312 is small, thereby realizing a compact, reliable and stable torque limiter.

Although not mentioned above, by applying grease between the first and second washers 309 and 312, the coefficient of friction between the first and second washers 309 and 312 is further made to be more stable.

Although Example 1 of the present invention has been described with reference to a reel mount, it is appreciated that the structure of the reel mount can be embodied as a torque limiter which does not have an element for engagement with a reel in a cassette, such as the rotator engagement member 305.

In the above description, although the first washer 309 is made of a resin-based material and the second washer 312 is made of a metal-based material, the first washer 309 may be made of a metal based-material and the second washer 312 may be made of a resin-based material.

As described above, the present invention achieves an advantageous effect of providing a compact torque limiter, which includes two washers between first and second rotors so as to generate stable clutch torque.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A torque limiter, comprising:
   a first rotor and a second rotor;
   a magnet which is provided so as to be in contact with the first rotor; and
   a hysteresis board provided so as to be opposed to the magnet with a space therebetween,
   wherein the hysteresis board is integrally formed with the second rotor, and
   first and second washers are provided between the first and second rotors so as to be in contact with one another.

2. A torque limiter according to claim 1, wherein one of the first and second washers is made of a metal-based material and the other one of the first and second washers is made of a resin-based material.

3. A torque limiter according to claim 1, wherein one of the first and second washers is made of a steel-based metal material.

4. A torque limiter according to claim 1, wherein one of the first and second washers is made of anyone of polyethylene, UHMW polyethylene, POM, FR, PET, PA, PPS, PBT, PI and PEEK.

5. A torque limiter according to claim 1, wherein the first washer includes portions for engagement with the first rotor and the second washer includes portions for engagement with the second rotor.

6. A torque limiter according to claim 5, wherein an outer circumference of the first washer is provided with the portions for engagement with the first rotor and an inner circumference of the second washer is provided with the portions for engagement with the second rotor.

7. A torque limiter according to claim 6, wherein the magnet is provided with a protrusion portion which interlocks with the engagement portion of the first washer so as to provide engagement of the first washer with the first rotor through the contact of the magnet and a yoke board integrally formed with the first rotor.

8. A torque limiter according to claim 6, wherein the second rotor is provided with a protrusion portion which interlocks with the engagement portion of the second washer so as to provide engagement of the second washer with the second rotor.

9. A torque limiter according to claim 1, the first and second rotors are rotatable about a single rotation shaft.

10. A torque limiter according to claim 2, wherein one of the first and second washers is made of a steel-based metal material and the other one of the first and second washers is made of any one of polyethylene, UHMW polyethylene, POM, FR, PET, PA, PPS, PBT, PI and PEEK.

* * * * *